United States Patent
Hsieh (10) Patent No.: US 6,784,884 B1
(45) Date of Patent: Aug. 31, 2004

(54) EFFICIENT PARAMETRIC SURFACE BINNING BASED ON CONTROL POINTS

(75) Inventor: Hsien-Cheng Emile Hsieh, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/676,025

(22) Filed: Sep. 29, 2000

(51) Int. Cl.[7] .............................................. G06T 15/40
(52) U.S. Cl. ....................................................... 345/421
(58) Field of Search .............................. 345/421, 419, 345/418, 423, 585

(56) References Cited

U.S. PATENT DOCUMENTS

| | | | |
|---|---|---|---|
| 5,255,352 A | * 10/1993 | Falk | 345/582 |
| 5,317,682 A | * 5/1994 | Luken, Jr. | 345/442 |
| 5,680,525 A | * 10/1997 | Sakai et al. | 345/585 |
| 5,886,701 A | 3/1999 | Chauvin et al. | 345/418 |
| 6,169,549 B1 | * 1/2001 | Burr | 345/419 |
| 6,219,058 B1 | * 4/2001 | Trika | 345/423 |
| 6,269,175 B1 | * 7/2001 | Hanna et al. | 382/107 |
| 6,563,501 B2 | * 5/2003 | Sfarti | 345/442 |

OTHER PUBLICATIONS

Jay Torborg, et al., "Talisman: Commodity Realtime 3D Graphics For The PC", Microsoft Corporation, Proceedings of SIGGRAPH 96, 11 pgs., Aug. 1996.

* cited by examiner

Primary Examiner—Mark Zimmerman
Assistant Examiner—Huedung X. Cao
(74) Attorney, Agent, or Firm—Shireen I. Bacon (57) ABSTRACT

A method and apparatus for efficient parametric surface binning based on control points. One method of the present invention comprises transforming control points for a parametric surface. An extent of the control points is determined. Tiles interested by the extent are determined. The parametric surface is stored into the tiles.

24 Claims, 12 Drawing Sheets

EFFICIENT PARAMETRIC SURFACE BINNING BASED ON CONTROL POINTS

FIELD OF THE INVENTION

The present invention relates generally to the field of three dimensional (3D) graphics processing, and more particularly to efficient parametric surface binning based on control points.

BACKGROUND OF THE INVENTION

Three dimensional or 3D objects are typically represented on computer display screens as being composed of graphics primitives such as triangle lists, triangle strips, and triangle fans. The graphics primitives are defined by a host computer or a graphics processor in terms of primitive data. For instance, the three vertices of each triangle in a primitive are defined in terms of its spatial location with X, Y, and Z coordinates. Additional data defines the red, green, and blue (RGB) color values and texture coordinates of each vertex. Other primitive data can be included depending on each specific application. Rendering hardware processes the primitive data to activate display screen pixels that compose each primitive and the RGB color values for each pixel.

A technique called "tiling" (or chunking, as some literature's naming convention) is often used to improve the memory bandwidth required for rendering the graphics primitives. In this scheme, the display screen is partitioned into tiles (or bins as in the naming convention of some literature) that span the display screen. Each tile is rendered independently of the others by the graphics processor or host computer. With the help of tile sized caches that retain the color (RGB) and depth data of a tile, memory bandwidth can be reduced dramatically. This improves graphics processing performance since 3D graphics processing is most often limited by the available memory bandwidth in the computer system.

Figure 1A:
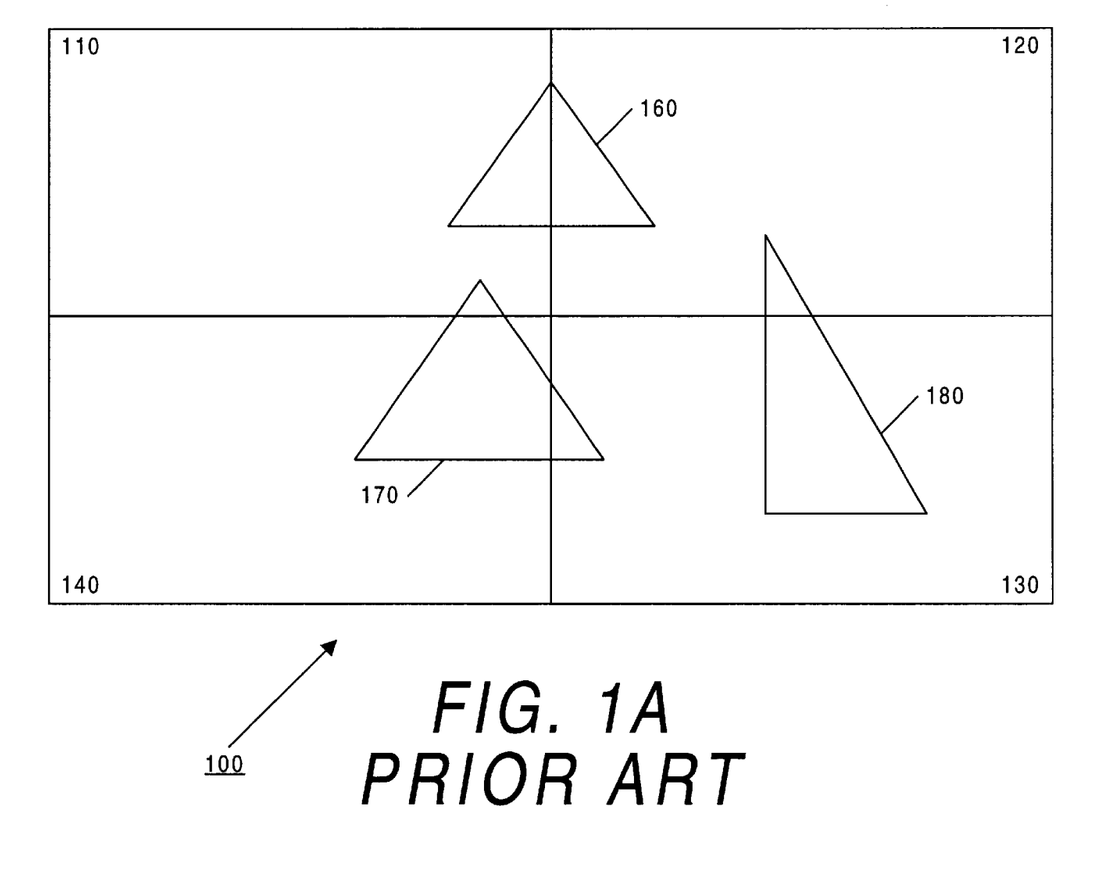
FIG. 1A is a diagram depicting several 3D objects arranged on a display screen in accordance with prior art systems.
Figure 1B:
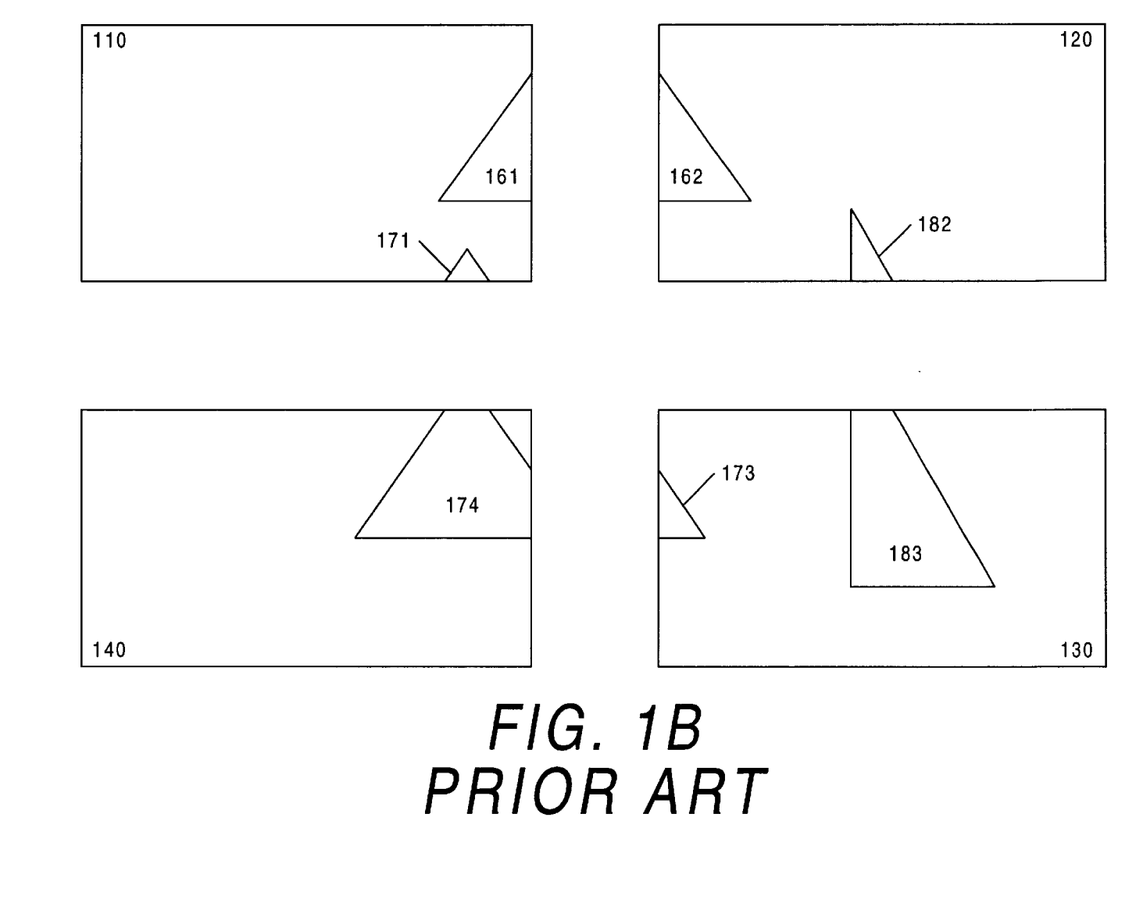
FIG. 1B is a diagram depicting the several objects of FIG. 1A sorted into bins in accordance with prior art systems.

Tiling involves the sorting of graphics primitives into bins or tiles. FIGS. 1A and 1B show an example of sorting graphics primitives into bins or tiles. FIG. 1A is a diagram depicting several 3D objects arranged on a display screen 100 in accordance with prior art systems. The display screen 100 is partitioned into four rectangular tiles (or bins) 110, 120, 130, and 140. In this example, 3D primitives 160, 170, and 180 are received by a processor. The processor sorts the 3D primitives 160, 170, 180 into bins 110, 120, 130, 140. Although this example describes the screen area as divided into only four bins, other embodiments can have the screen divided into any of a wide range of numbers or shapes of bins. Typically, the number of bins would greatly exceed four. After receiving data for a graphics primitive, the processor determines which bin or tile the primitive intersects. The sorting of graphic primitives to the bins that the primitives intersect is hence called binning.

FIG. 1B is a diagram depicting the several objects of FIG. 1A sorted into bins. For example, the processor determines that the 3D primitive 160 is located partially within bin 110 and partially within bin 120. The processor then delivers copies of the various primitives to the graphics memory storage areas for whatever bins the primitives intersect. Here, the processor would deliver copies of the primitive data for 3D primitive 160 to the graphics memory storage area for bins 110 and 120. Another 3D primitive 170 is located within bin 110, within bin 130, and within bin 140. Similarly, 3D primitive 180 is located within bin 120 and bin 130. The data for the other objects are also stored accordingly.

Once the 3D primitives 160, 170, 180 are sorted into bins, a graphics processor reads the data for each bin on a bin-by-bin basis and divides the larger primitives into smaller primitives that fit within each tile. For example, 3D primitive 160 is divided by the graphics processor to create primitive 161 within bin 110 and primitive 162 within bin 120. The 3D primitive 170 is divided by the graphics processor to create primitive 171 within bin 110, primitive 173 within bin 130, and primitive 174 within bin 140. The 3D primitive 180 is divided by the graphics processor to create primitive 182 within bin 120 and primitive 183 within bin 130. The divided 3D primitives are then delivered to drawing and rendering engines on a bin-by-bin basis.

Figure 2:
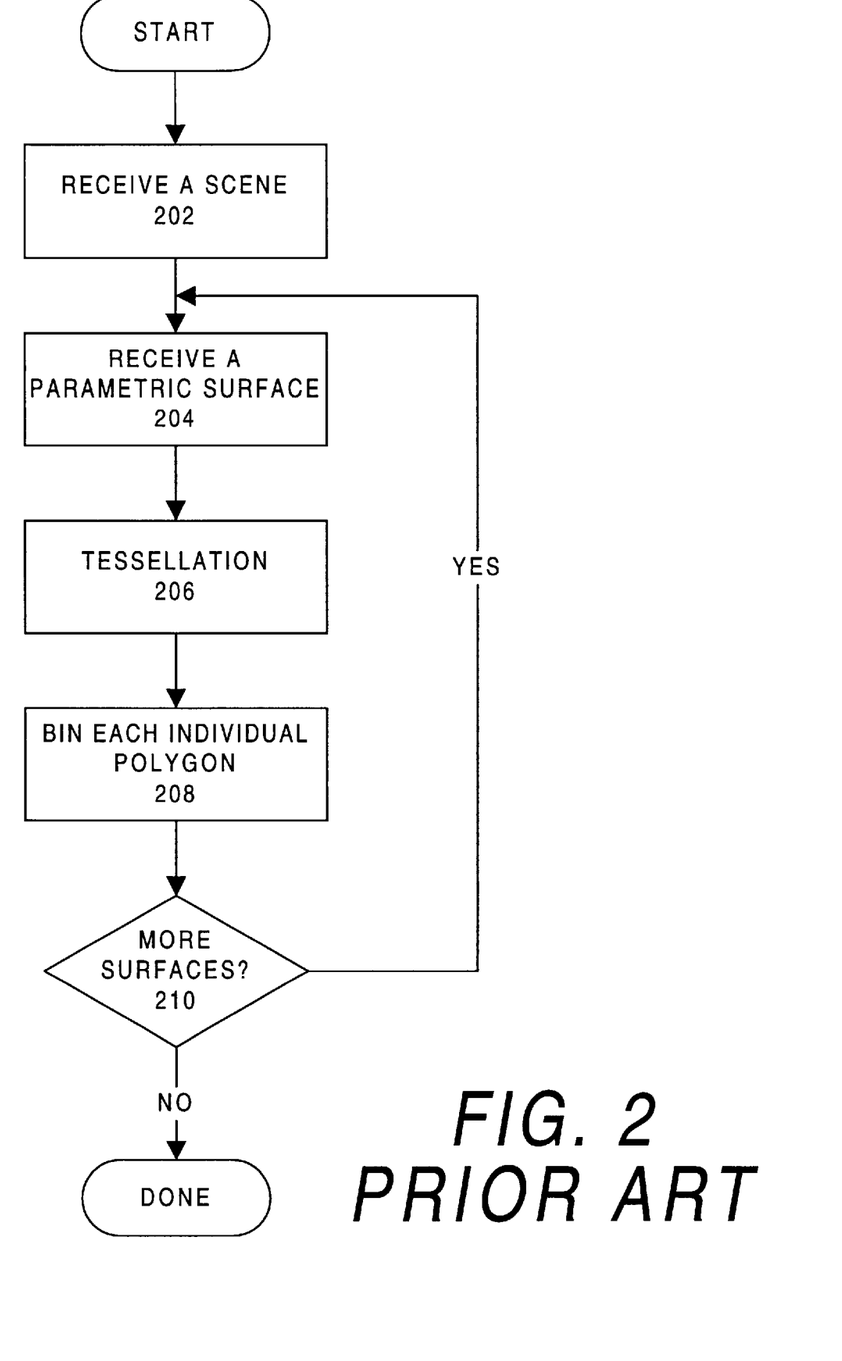
FIG. 2 is a flow diagram of a prior art method for handling parametric surfaces.

FIG. 2 is a flow diagram of a prior art method for handling parametric surfaces in a tiled graphics architecture. At step 202, the processor receives a scene which consists of multiple parametric surfaces. The scene is processed by rendering all of the parametric surfaces in the scene. Each parametric surface is received from the scene at step 204. Tessellation of the parametric surface occurs at step 206. Tessellation is the process of converting the parametric surfaces into 3D primitives. At step 208, each 3D primitive is sorted and binned. The processor checks at step 210 whether additional surfaces are present in the scene and still have to be processed. If there are more surfaces, the process repeats at step 204. If there are no more surfaces for processing, the scene is done.

There is a growing trend towards using parametric surfaces as the basis for 3D graphics rendering. However the prior art of converting parametric surfaces into 3D primitives increases the amount of data to be transferred to graphics processors. In a tiled graphic architecture, this increase is amplified by the need to duplicate each 3D primitive to each and every bin the primitive intersects. The bandwidth increase due to tessellation and binning can adversely affect the bandwidth saving advantage of tiling. Hence a technique for efficient binning of these parametric surfaces is desirable.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and apparatus for efficient parametric surface binning based on control points is disclosed. The described binning mechanism may be used to render parametric surfaces in graphical displays, but have other applications as well. The embodiments described herein are described in the context of a computer display and bicubic Bezier surfaces, but are not so limited. Although the following embodiments are described with reference to graphics controllers, other embodiments are applicable to other integrated circuits or logic devices. The same techniques and teachings of the present invention can easily be applied to other types of circuits or semiconductor devices that use graphics rendering or manipulate parametric surfaces.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known image and 3D graphics processing techniques and graphics circuits have not been set forth in particular detail in order to not necessarily obscure the present invention.

For the following examples, certain terms and phrases are used throughout the written description. The terms "geometric primitives" and "primitives" are used interchangeable to refer to simple geometric shapes such as points, lines, polygons, etc. "Bucket rendering", "tile-based rendering", "chunking", "zone rendering", "bucket rendering technique", and "bucket rendering scheme" are used interchangeably to refer to one type of rendering method.

A typical graphics system processes input data in two stages: a geometry stage and a rendering stage. The geometry stage manages the geometric descriptions of objects to be displayed. The geometric descriptions can describe curved surfaces, polygons, lines, points, or any combination. The geometry stage also prepares appropriate rendering attributes (color, texture coordinates etc) for the rendering stage. The rendering stage manages memory and converts geometric descriptions and rendering attributes into pixels for display.

Parametric surfaces are mathematical descriptions of surfaces or curves in 3D space. Parametric surfaces are superior to traditional polygonal or line approximations of 3D primitives in terms of storage requirement and flexibility. Embodiments of the present invention address binning parametric surfaces via control points. These control points are key points in 3D space that define the parametric surface to be rendered.

Parametric surfaces, in comparison with polygons, can offer better modeling flexibility and use potentially less storage space. Parametric surfaces are also the next step in graphics hardware evolution. Additionally, tile-based rendering or tiling is needed to combat the cost of explosive bandwidth growth for graphics rendering. Efficient coexistence of parametric surface with tiling can be desirable. Embodiments of the invention can also accommodate this coexistence issue.

One method of one embodiment comprises of first transforming the control points from the model space to the space in which the binning is performed. The binning space can be the homogeneous or display screen space. In this embodiment the screen space is used for binning. Screen coverage is determined in terms of tiles intersected by the convex hull spanned by the control points. The parametric surface can be inserted into these tiles and rendered.

One prior art method performs parametric surface binning by first converting the surface into polygonal description. This process is called tessellation. Binning is then performed on each individual polygon. One disadvantage of this approach is that the polygonal representation can contain much more data than the original surface. For instance, a bicubic Bezier surface contains sixteen control points, each consisting of three values representing the X, Y and Z coordinate in the Cartesian coordinates. The bicubic Bezier surface can be tessellated into a triangle list by uniformly double sampling in each of its parametric direction. This triangle list would require forty-nine vertices. Each of these vertices is of the same size as the control points of the bicubic Bezier surface. This represents more than a three times increase of the memory storage requirement, and also a more than three-fold increase in memory bandwidth. This effect can adversely affect the bandwidth saving benefit of tile-based rendering. Furthermore, the time required to perform the binning process can also increase due to the much larger number of vertices.

Embodiments of the present invention addresses the data and time requirements by moving the binning process from a per polygon basis to a per surface basis. Binning on per surface basis can be advantageous because the number of control points can be much smaller than the number of vertices in a polygonal representation. The following example will illustrate this point in greater detail. A bicubic Bezier surface contains 16 control points. The cost of binning consists of transforming the 16 control points, determining the screen coverage spanned by the bounding box of these control points, and writing the surface to all tiles intersected by the bounding box. If the surface is tessellated by uniformly double sampling in both parametric directions, then the polygonal representation consists of a total of 36 quads. The cost of binning in this case consists of transforming 49 vertices of the surface, finding screen coverage on the 36 quads, and writing each individual quad to all the tiles intersected. This example indicates that the prior method has an increase of more than three times in the number of transformations and a very large thirty six times increase in terms of finding the screen coverage. The number of control points are usually much smaller with binning on a per surface basis than the number of vertices in the polygonal representation.

Figure 3:
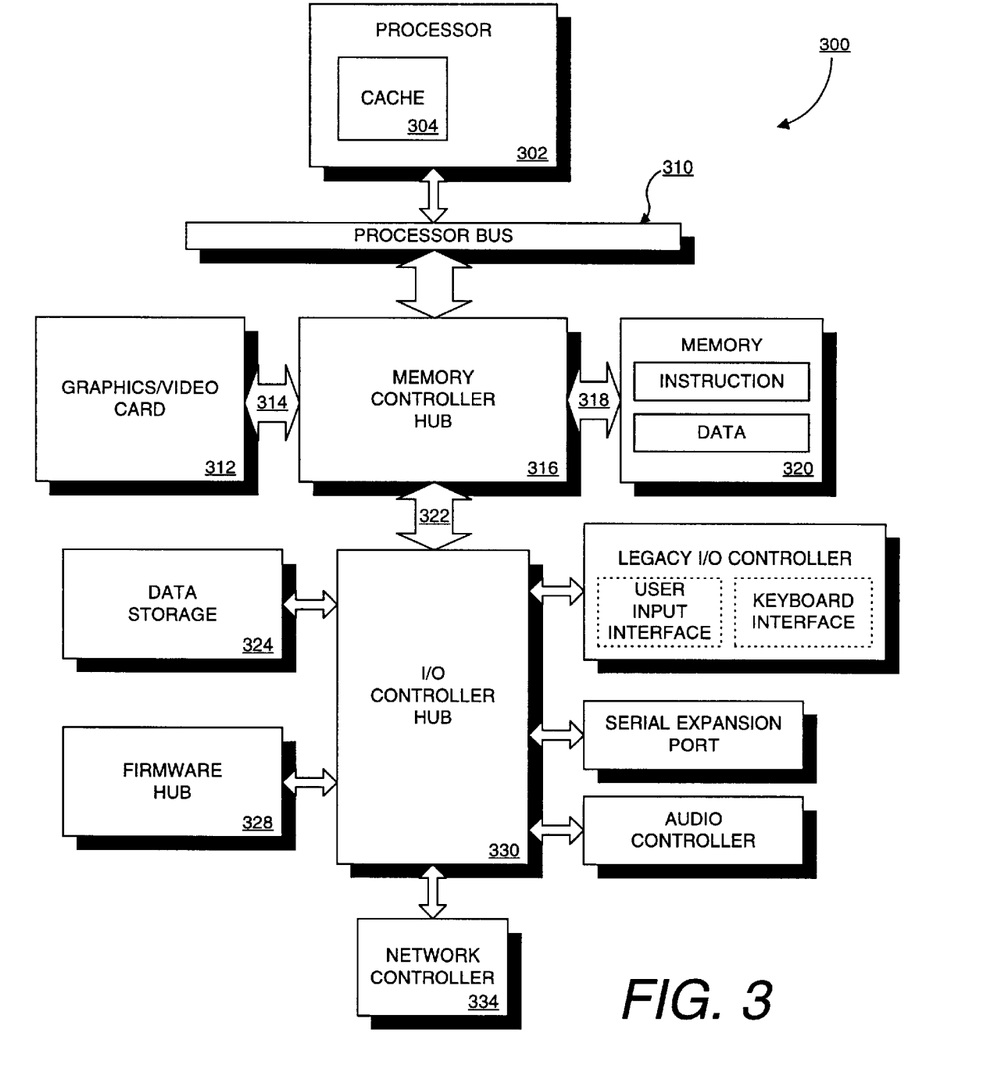
FIG. 3 is a block diagram of one embodiment of a computer system that performs parametric surface binning based on control points.

Referring now to FIG. 3, a computer system 300 is shown. System 300 includes a component, such as a graphics/video card 312, employing a parametric surface binning mechanism in accordance with the present invention, such as in the embodiment described herein. System 300 is representative of processing systems based on the PENTIUM® Pro, PENTIUM® II, PENTIUM® III, Itanium® microprocessors available from Intel Corporation of Santa Clara, Calif., although other systems (including PCs having other microprocessors, engineering workstations, set-top boxes and the like) can also be used. In one embodiment, sample system 300 may be executing a version of the WINDOWS™ operating system available from Microsoft Corporation of Redmond, Wash., although other operating systems and graphical user interfaces, for example, may also be used.

Thus, the present invention is not limited to any specific combination of hardware circuitry and software.

FIG. 3 is a block diagram of one embodiment of a system 300. System 300 is an example of a hub architecture. The computer system 300 includes a processor 302 that processes data signals. The processor 302 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 3 shows an example of an embodiment of the present invention implemented in a single processor system 300. However, it is understood that other embodiments may alternatively be implemented as systems having multiple processors. Processor 302 is coupled to a processor bus 310 that transmits data signals between processor 302 and other components in the system 300. The elements of system 300 perform their conventional functions well known in the art.

System 300 includes a memory 320. Memory 320 may be a dynamic random access memory (DRAM) device, a static random access memory (SRAM) device, flash memory device, or other memory device. Memory 320 may store instructions and/or data represented by data signals that may be executed by processor 302. A cache memory 304 can reside inside processor 302 that stores data signals stored in memory 320. Alternatively, in another embodiment, the cache memory may reside external to the processor.

A system logic chip 316 is coupled to the processor bus 310 and memory 320. The system logic chip 316 in the illustrated embodiment is a memory controller hub (MCH). The processor 302 communicates to the MCH 316 via a processor bus 310. The MCH 316 provides a high bandwidth memory path 318 to memory 320 for instruction and data storage and for storage of graphics commands, data and textures. The MCH 316 directs data signals between processor 302, memory 320, and other components in the system 300 and bridges the data signals between processor bus 310, memory 320, and system I/O 322. In some embodiments, the system logic chip 316 provides a graphics port for coupling to a graphics controller 312. The MCH 316 is coupled to memory 320 through a memory interface 318. The graphics card 312 is coupled to the MCH 316 through an Accelerated Graphics Port (AGP) interconnect 314.

A graphics mechanism for performing parametric surface binning also resides in graphics/video card 312. Alternate embodiments of a parametric surface binning mechanism can also be used in microcontrollers, embedded processors, graphics devices, DSPs, and other types of logic circuits.

System 300 uses a proprietary hub interface bus 322 to couple the MCH 316 to the I/O controller hub (ICH) 330. The ICH 330 provides direct connections to some I/O devices. Some examples are the audio controller, firmware hub (BIOS) 328, data storage 324, legacy I/O controller containing user input and keyboard interfaces, a serial expansion port such as Universal Serial Bus (USB), and a network controller 334. The data storage device 324 can comprise a hard disk drive, a floppy disk drive, a CD-ROM device, a flash memory device, or other mass storage device.

The present enhancement is not limited to computer systems. Alternative embodiments of the present invention can be used in other devices such as, for example, handheld devices and embedded applications. Some examples of handheld devices include Internet Protocol devices, digital cameras, personal digital assistants (PDAs), and handheld PCs. Embedded applications can include a microcontroller, a digital signal processor (DSP), system on a chip, network computers (NetPC), set-top boxes, or any other system which processes parametric surfaces for other embodiments.

Figure 4:
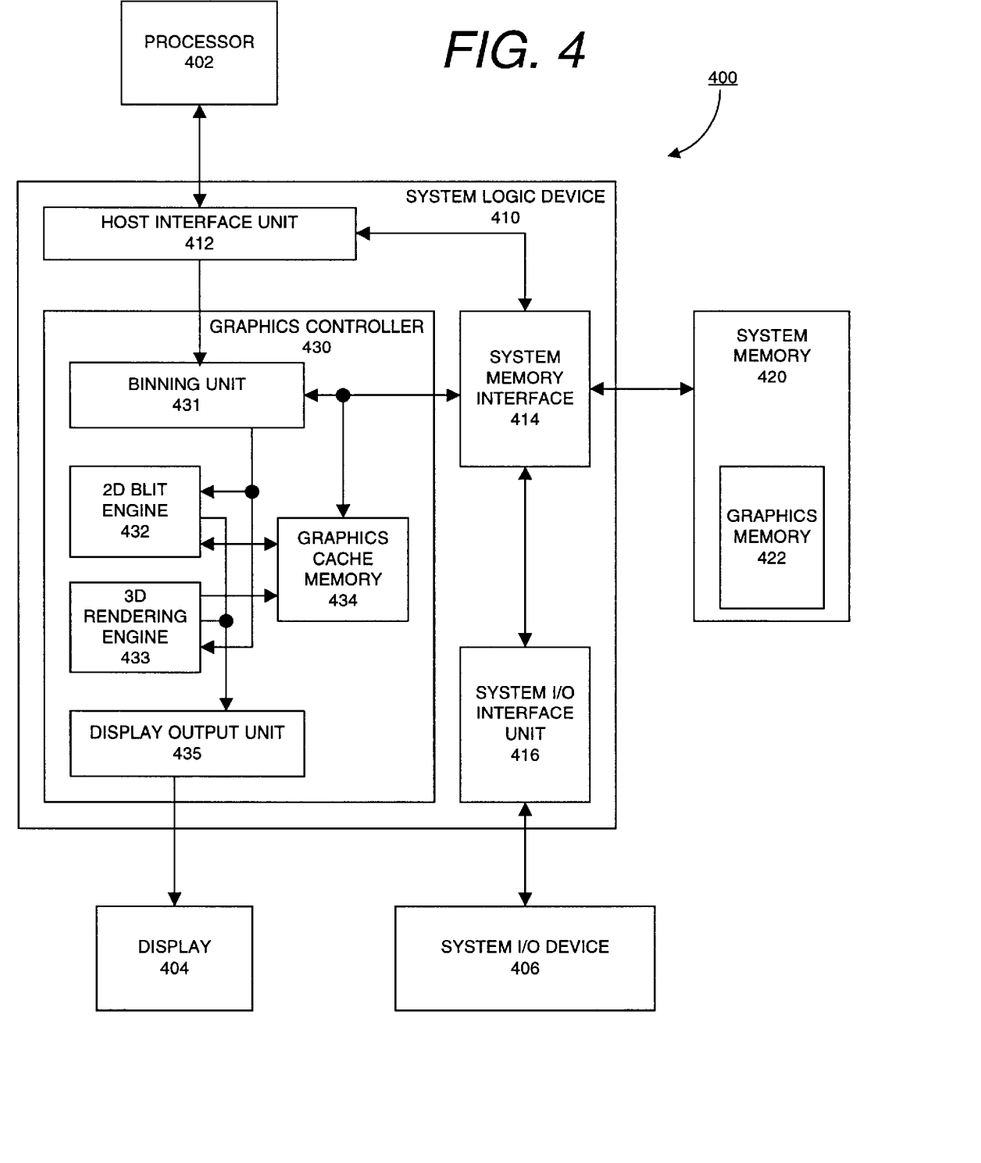
FIG. 4 is a block diagram of a system including a system logic device that performs parametric surface binning based on control points.

FIG. 4 is a block diagram of a system including a system logic device that performs parametric surface binning based on control points. A graphics controller 430 is located within system logic device 410. The graphics controller 430 includes a binning unit 431, a 2D blit engine 432, a 3D rendering engine 433, a display output unit 435, and a graphics cache memory 434. The 2D blit engine 432 is meant to represent a broad range of circuits utilized to perform 2D blit operations. The 3D rendering engine 433 is meant to represent a broad range of circuits utilized to process 3D primitives and parametric surfaces. Similarly, the display output unit 435 represents a broad range of circuits utilized to convert graphics display data into a form suitable for delivery to a display monitor. The display output unit 435 is connected to a display 404.

In addition to the graphics controller 430, the system logic device 410 also includes a host interface unit 412, a system memory interface 414, and a system input/output interface unit 416. The host interface unit 412 serves to couple various units within the system logic device 410, including the binning unit 431 and the system memory interface 414, with a processor 402. The system memory interface 414 provides communication between the system logic device 410 and a system memory 420. The system memory 420 can include a graphics memory space 422. The system input/output interface unit 416 couples the system logic device 410 to a system input/output device 406. The system input/output device 406 can include a broad range of input/output devices such as hard disk controllers, keyboard controllers, etc.

Among its activities, the processor 402 can receive a stream of graphics commands and primitives. The graphics commands and primitives can include 3D primitives, 3D surfaces, and 2D blit operations. The processor 402 sorts the 3D primitives, 3D surfaces, and 2D blit operations into a number of bins. As part of the binning process, the processor 402 writes copies of 3D primitives, 3D surfaces, and 2D object data to bin storage areas within the graphics memory 422.

The graphics controller 430 reads data from the graphics memory 422 on a bin-by-bin basis. The bin data can be stored in the graphics cache memory 434 inside the graphics controller 430 or can be fetched from graphics memory on demand, although the existence of graphics cache memory is highly desirable. The graphics cache memory 434 is preferably large enough to store at least enough display data of one bin. The graphics cache memory 434 accesses the graphics memory 422 via the system memory interface 414. The data for each bin is delivered to the binning unit 431. The binning unit 431 divides the 3D primitives, parametric surfaces, and 2D objects into smaller primitives and objects that fit within whichever bin the graphics controller 430 is currently processing, as discussed above in connection with FIGS. 5A–D and 6A–B.

The binning unit then delivers the divided 3D primitives, parametric surfaces, and 2D blit operations to either the 2D blit engine 432 or the 3D rendering engine 433. Both the 2D blit engine 432 and the 3D rendering engine 433 are coupled to the graphics cache memory 434. This configuration allows the 2D blit engine 432 access to intermediate rendering results stored by the 3D rendering engine 433 in the graphics cache memory 434 or vice versa.

For this example embodiment, the system memory 420 includes the graphics memory space 422. Other embodiments are possible that utilize a separate graphics memory. Additional embodiments are also possible where the graphics controller 430 performs the binning operations. Still more embodiments are possible where the graphics controller 430 is not integrated into a system logic device but is contained in a discrete device and coupled to the processor 402 via a system logic device.

Example methods of the present invention are illustrated below. For ease of illustration, a parametric curve is described, but the same method can be similarly applied to other parametric surfaces. For each parametric surface, its control points are first transformed. Second, the extent of the transformed control points are found by computing the convex hull of the surface. Third, all the tiles that the extent intersects are found. Fourth, the parametric surface is stored into all tiles found.

Figure 5A:
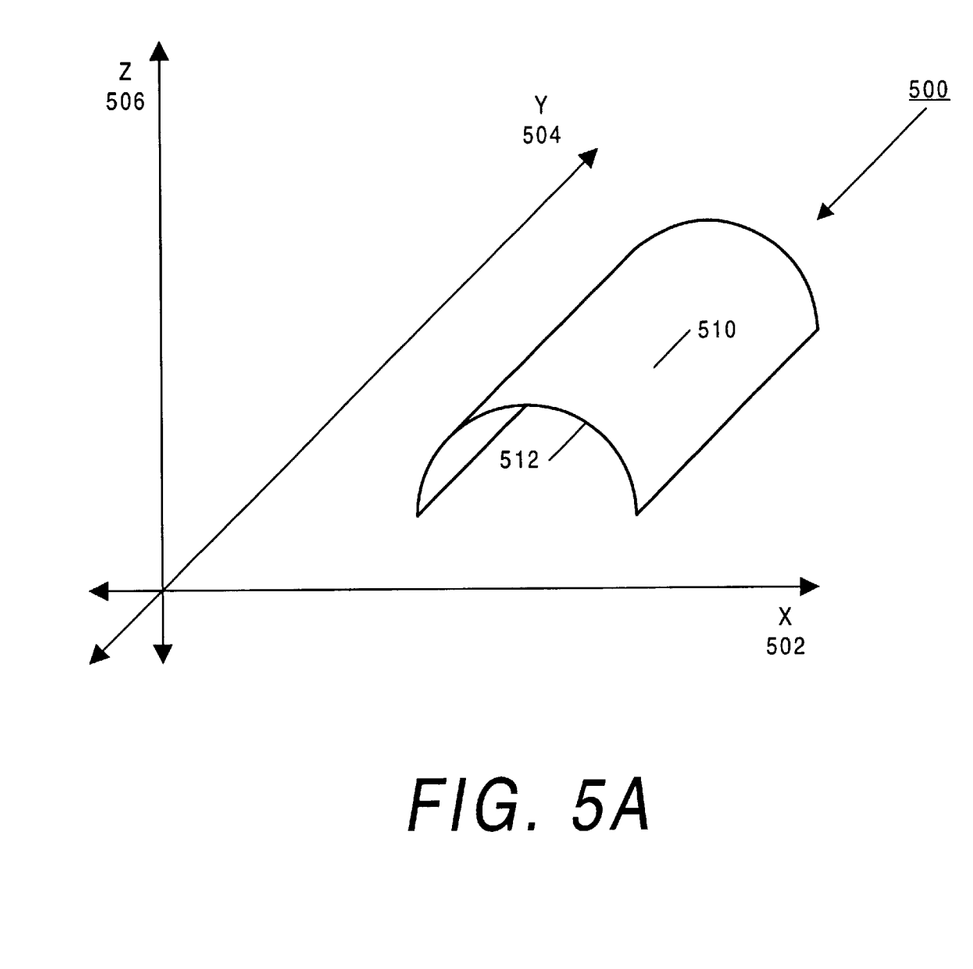
FIG. 5A is a diagram of a parametric surface in a 3D space.

FIGS. 5A–D are used in conjunction to illustrate efficient parametric surface binning based on control points in accordance with one embodiment. FIG. 5A is a diagram of a parametric surface 510 in a 3D space 500 to be drawn on a display screen. This 3D space 500 is denoted as having an X axis 502, a Y axis 504, and a Z axis 506. The parametric surface 510 of this example extends lengthwise along the Y axis 504. The front edge of the surface 510 forms a curve C 512 that extends along the X axis 502 and Z axis 506.

Figure 5B:
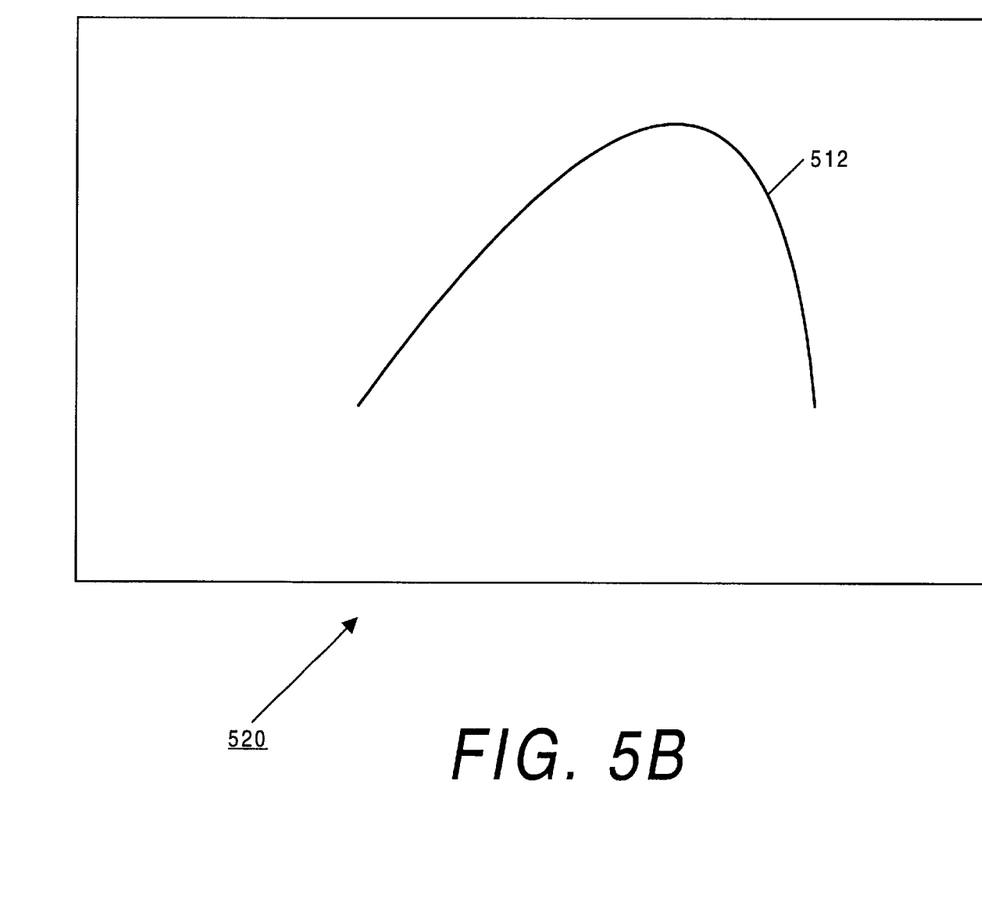
FIG. 5B is a diagram of a front view of the parametric surface of FIG. 5A along the X axis.

For this embodiment, the parametric surface 510 is received by a microprocessor. FIG. 5B is a diagram of a front view 520 of the parametric surface 510 of FIG. 5A along the X axis 502 and Z axis 506. The front view of the surface 510 appears as a 2D curve 512. The parametric surface 510 extends into the page along the Y axis 504.

Figure 5C:
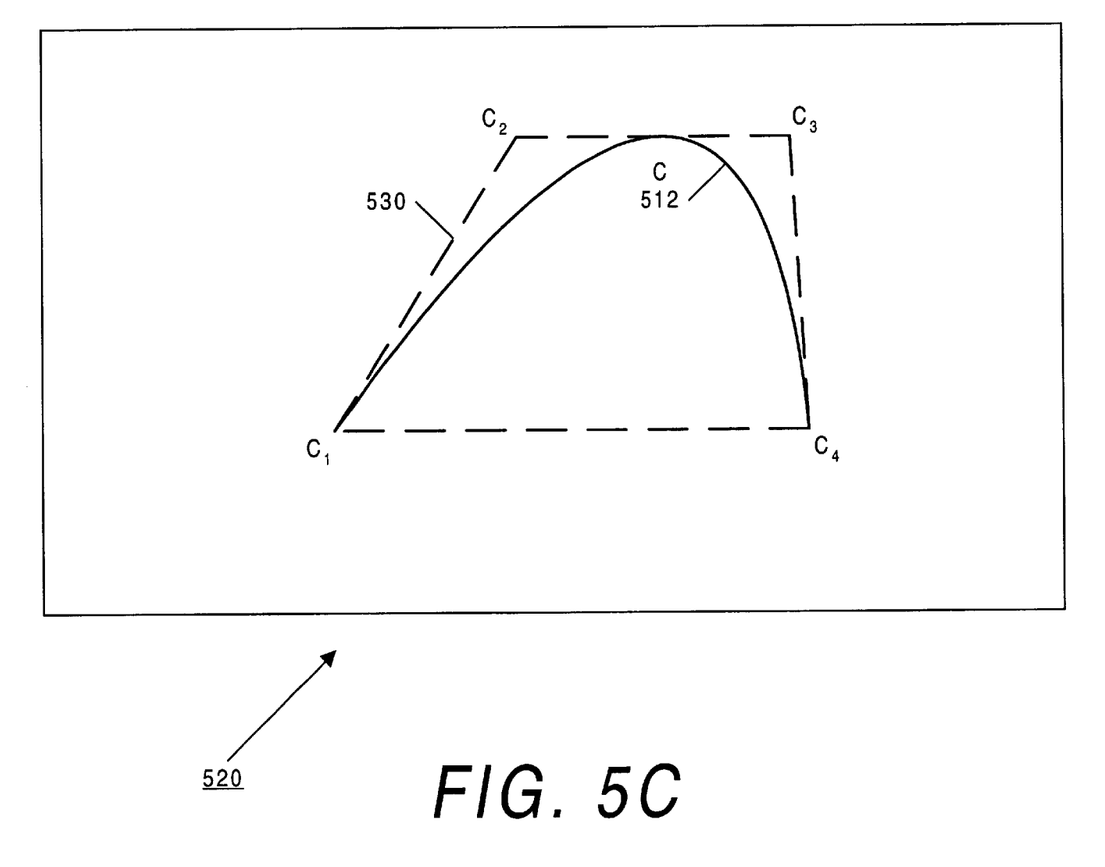
FIG. 5C is a diagram of the curve of FIG. 5B transformed with a cubic Bezier bounding box in accordance with one embodiment.

FIG. 5C is a diagram of the curve C 512 of FIG. 5B transformed with a cubic Bezier bounding box 530 in accordance with one embodiment. Control points of curve C comprise of $C_1$, $C_2$, $C_3$, and $C_4$. These points can be described in terms of X, Y, and Z coordinates. For instance, $C_1$ as $(X_1, Y_1, Z_1)$, $C_2$ as $(X_2, Y_2, Z_2)$, $C_3$ as $(X_3, Y_3, Z_3 C_4$ as $(X_4, Y_4, Z_4)$. The cubic Bezier curve bounding box 530 formed with control points $C_1$, $C_2$, $C_3$, and $C_4$ can also be described as $$C(x, y, z) = \sum_{i=0}^{3} B_i(t)C_i, 0 \leq t \leq 1 = B_0(t)C_0 + B_1(t)C_1 + B_2(t)C_2 + B_3(t)C_3$$

wherein $B_0=t^3$, $B_1=3t^2(1-t)$, $B_2=3t(1-t)^2$, and $B_3=(1-t)^3$ for $0 \leq t \leq 1$. For this embodiment, a cubic Bezier curve is used. For alternative embodiments, splines such as a non-uniform rational B-spline (NURBS) Splines, or rational Bezier curves can be used.

Figure 5D:
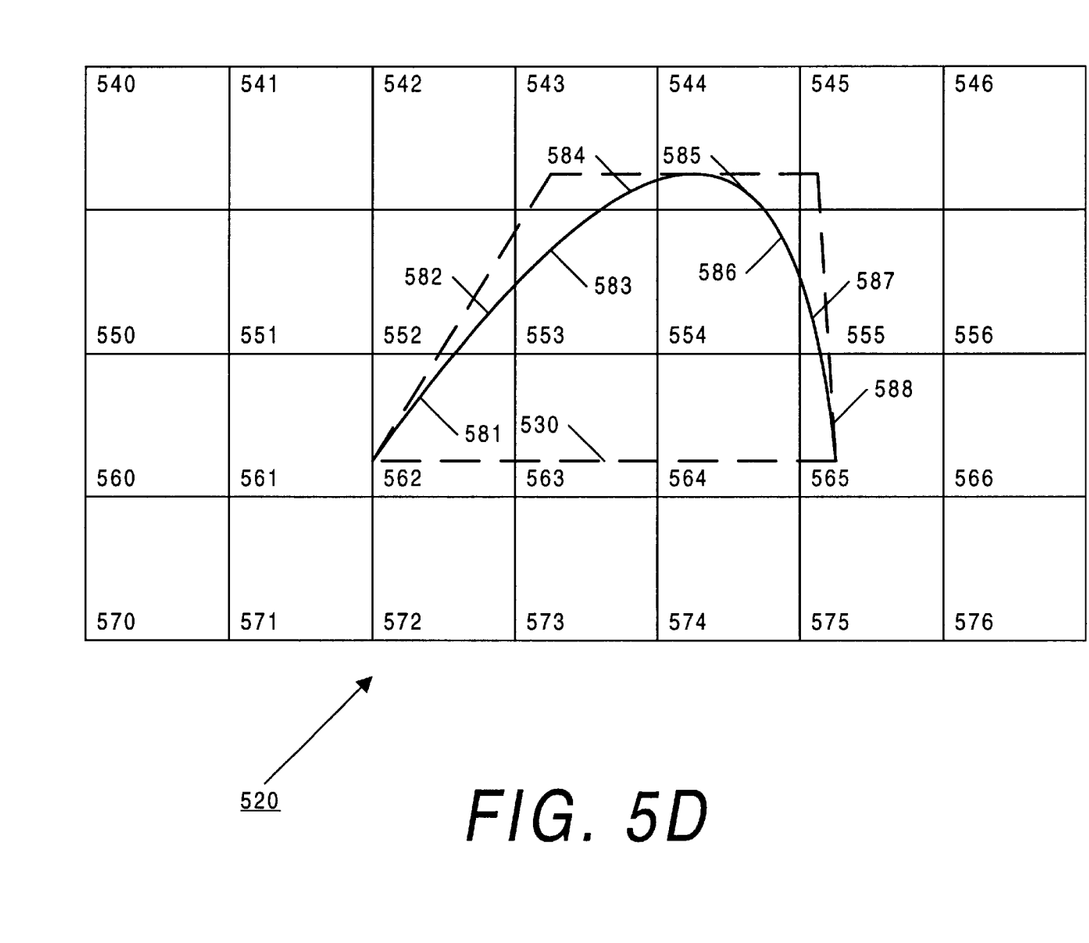
FIG. 5D is a diagram of the curve of FIG. 5C sorted into bins in accordance with one embodiment of the invention.

FIG. 5D is a diagram of the curve 512 of FIG. 5C sorted into bins 540–546, 550–556, 560–566, 570–576 in accordance with one embodiment of the invention. The screen 520 of this embodiment is divided into four rows and seven columns for a total of twenty eight bins. The microprocessor sorts the parametric surface 510 into one or more of bins 540–546, 550–556, 560–566, 570–576. Although this example describes the screen display area as having twenty eight bins, other embodiments are possible with the screen display area divided into any of a wide range of number of bins. As illustrated in Figure 5D, the curve 512 falls partially within bins 543–545, 552–555, 562–565. The curve 512 is divided within the bins 543–545, 552–555, 562–565. A processor delivers copies of the curve 512 to the graphics memory storage areas for whatever bins the curve 512 intersects.

When the curve 512 are sorted into bins, a graphics controller reads the data for each bin on a bin-by-bin basis and divides the larger curve 512 into smaller curves that fit within each tile. For example, curve 512 is divided into smaller curves 581–588. Curve 581 is created within bin 562, curve 582 within bin 552, curve 583 within 553, curve 584 within bin 543, curve 585 within bin 544, curve 586 within bin 554, curve 587 within bin 555, and curve 588 within bin 565. The divided curve is delivered to drawing and rendering engines on a bin-by-bin basis.

FIGS. 5A–B and 6A–B are used in conjunction to illustrate efficient parametric surface binning based on control points in accordance with a second embodiment. FIGS. 5A–5B are the same as described above in the first embodiment. FIG. 5A is a diagram of a parametric surface 510 in a 3D space 500 to be drawn on a display screen. FIG. 5B is a diagram of a front view 520 of the parametric surface 510 of FIG. 5A along the X axis 502 and Z axis 506.

Figure 6A:
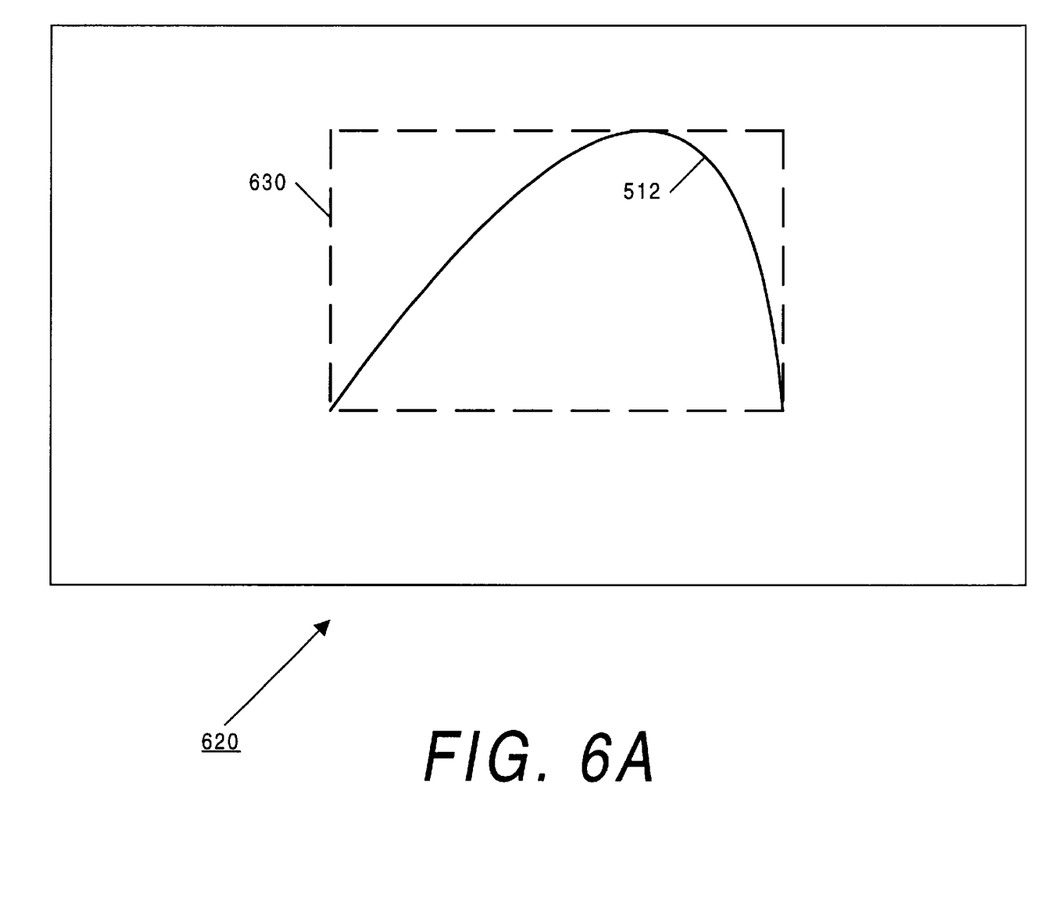
FIG. 6A is a diagram of the curve of FIG. 5B transformed with a rectangular bounding box.

FIG. 6A is a diagram of the curve 512 of FIG. 5B transformed with a rectangular bounding box 630 in accordance with a second embodiment. The rectangular bounding box 630 of this embodiment can be a simple rectangle or a square. This embodiment can be easier to use as the edges and vertices are clearly defined and identified. This characteristic can be advantageous during the step wherein the tiles that intersect the extent of the bounding box are identified.

Figure 6B:
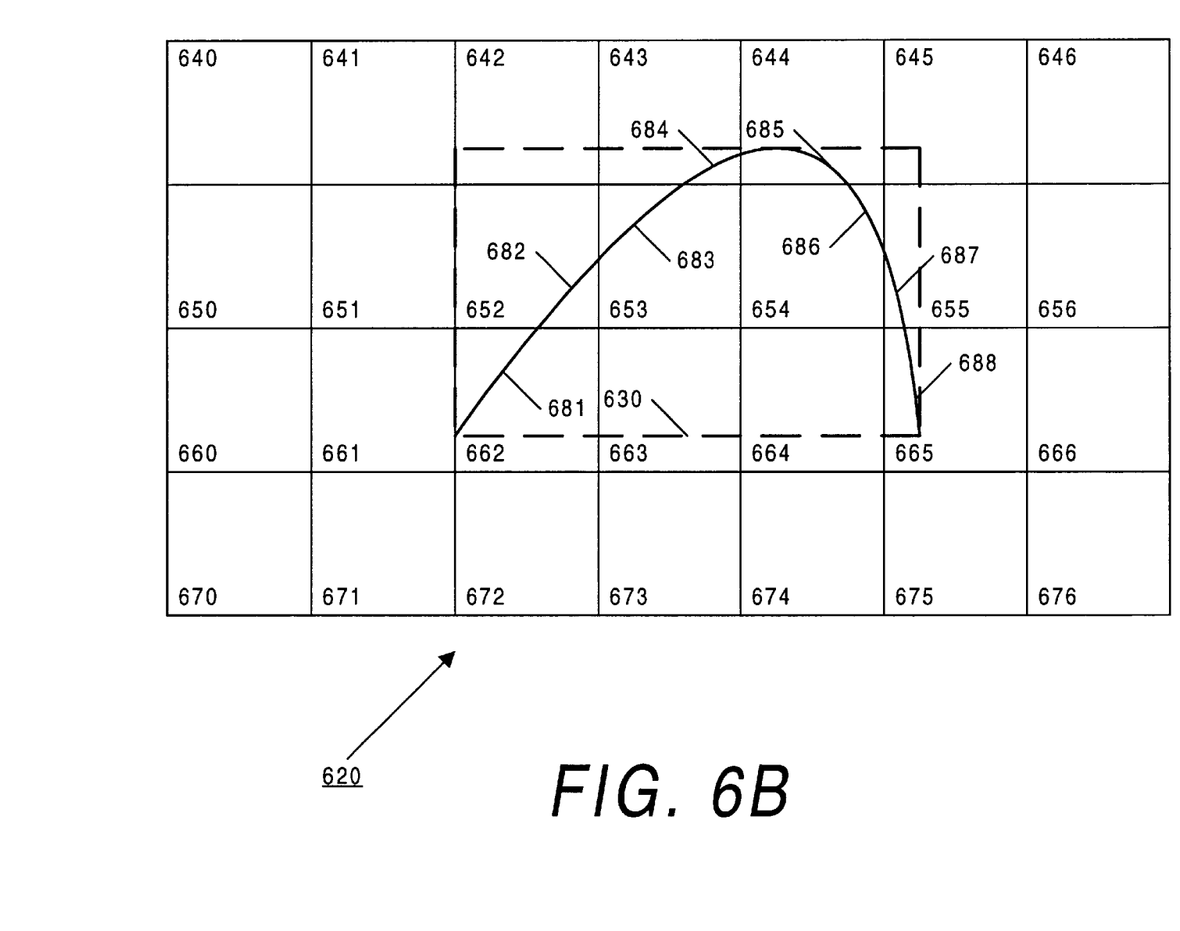
FIG. 6B is a diagram of the curve of FIG. 6A sorted into bins in accordance with another embodiment of the invention.

FIG. 6B is a diagram of the curve 512 of FIG. 6A sorted into bins 640–646, 650–656, 660–666, 670–676 in accordance with a second embodiment of the invention. The screen 620 of this embodiment is divided into four rows and seven columns for a total of twenty eight bins. The microprocessor sorts the parametric surface 510 into one or more of bins 640–646, 650–656, 660–666, 670–676. Although this example describes the screen display area as having twenty eight bins, other embodiments are possible with the screen display area divided into any of a wide range of number of bins. As illustrated in FIG. 6B, the curve 512 falls partially within bins 640–646, 650–656, 660–666, 670–676. The curve 512 is divided within the bins 640–646, 650–656, 660–666, 670–676. A processor delivers copies of the curve 512 to the graphics memory storage areas for whatever bins the curve 512 intersects.

When the curve 512 are sorted into bins, a graphics controller reads the data for each bin on a bin-by-bin basis and divides the larger curve 512 into smaller curves that fit within each tile. For example, curve 512 is divided into smaller curves 681–688. Curve 681 is created within bin 662, curve 682 within bin 652, curve 683 within 653, curve 684 within bin 643, curve 685 within bin 644, curve 686 within bin 654, curve 687 within bin 655, and curve 688 within bin 665. The divided curve is delivered to drawing and rendering engines on a bin-by-bin basis.

Figure 7:
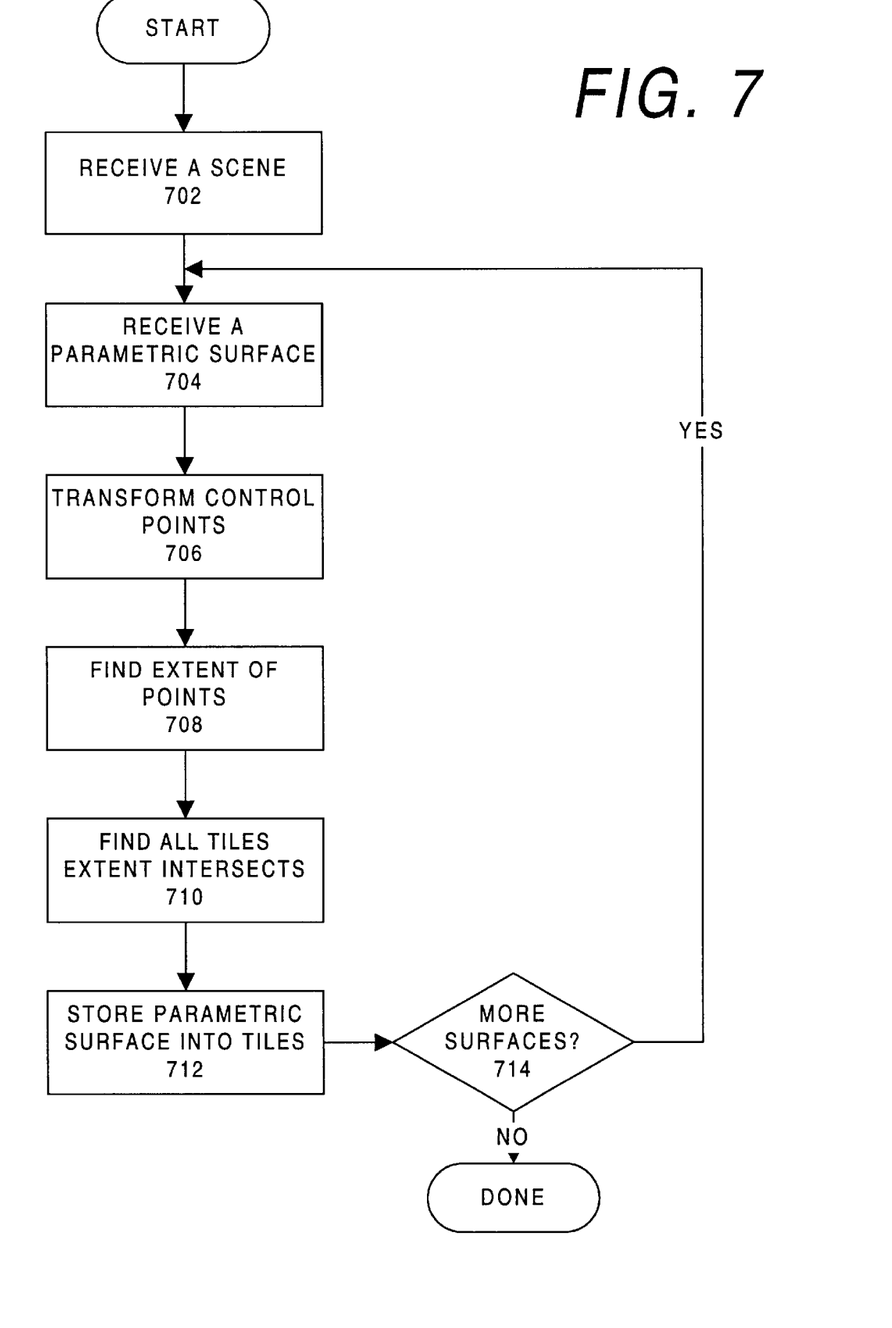
FIG. 7 is a flow diagram of an embodiment of a method for efficient parametric surface binning based on control points.

FIG. 7 is a flow diagram of an embodiment of a method for efficient parametric surface binning based on control points. At step 702, the processor receives a scene. The scene is processed and a parametric surface is received from the scene at step 704. The control points of the parametric surface are transformed at step 706.

At step 708, the extent of the parametric surface are found. For one embodiment, the extent is determined with the convex hull or bounding box of the cubic Bezier . For another embodiment, the extent is determined with a rectangular bounding box.

The screen is divided into tiles and the objects in the scene are binned. All the tiles that are intersected by the bounding box are found at step 710. The parametric surface is stored in these tiles that are within the extent of the control points at step 712. At step 714, the processor searches the scene to determine if any more parametric surfaces remain. If there are more surfaces, the process repeats at step 704. If no more parametric surfaces are to be processed, the scene is done.

Although the above example describes the efficient parametric surface binning via control points are described in the context of graphics controller, other embodiments of the present invention can be accomplished by way of software. Such software can be stored within a memory in the system. Similarly, the code can be distributed via a network or by way of other computer readable media. For instance, a computer program may be distributed through a computer readable medium such as a floppy disk or a CD ROM, or even a transmission over the Internet. Thus, a machine-readable medium can include any mechanism for storing or transmitting information in a form readable by a machine (e.g., a computer). For example, a machine-readable medium can include a read only memory (ROM), random access memory (RAM), magnetic disk storage media, optical storage media, flash memory devices, and electrical, optical, acoustical or other forms of propagated signals (e.g., carrier waves, infrared signals, digital signals, etc.).

In the foregoing specification, the invention has been described with reference to specific exemplary embodiments thereof. It will, however, be evident that various modification and change may be made thereof without departing from the broader spirit and scope of the invention as set forth in the appended claims. The specification and drawings are, accordingly, to be regarded in an illustrative rather than a restrictive sense.

What is claimed is:

1. A method comprising:
   transforming control points for a parametric surface on a per surface basis;
   determining extent of said control points for said parametric surface on said per surface basis with a bounding box defined by a cubic Bezier curve;
   determining tiles intersected by said extent; and
   storing said parametric surface into said tiles, wherein said storing comprises writing data for a plurality of control points corresponding to said parametric surface to a first tile storage area on a bin-by-bin basis.

2. The method of claim 1 wherein said parametric surface is a parametric curve.

3. The method of claim 1 wherein said extent is found with a convex hull of said parametric surface.

4. The method of claim 3 wherein said convex hull is defined by a cubic Bezier curve.

5. The method of claim 4 wherein said storing said parametric surface further comprises writing said data for said plurality of said vertices to a second tile storage area.

6. The method of claim 1 wherein said bounding box is a rectangular bounding box.

7. The method of claim 1 further comprising writing a plurality of pointers to a second tile storage area, said pointers to indicate location of said data for said plurality of said vertices.

8. The method of claim 1 wherein said transforming control points comprises generating a bounding box to circumscribe said parametric surface.

9. A method comprising:
   receiving a display screen having a parametric surface;
   transforming control points for said parametric surface on a per surface basis, wherein said parametric surface is circumscribed with a bounding box defined by a cubic Bezier curve;
   determining extent of said control points for said parametric surface on said per surface basis;
   tessellating said display screen into a plurality of tiles;
   determining all tiles said extent intersects;
   binning said parametric surface on said per surface basis, wherein data for a plurality of control points corresponding to said parametric surface are stored to a first tile storage area on a bin-by bin basis; and
   rendering said parametric surface.

10. The method of claim 9 wherein said display screen further comprises a three dimensional primitive.

11. The method of claim 9 wherein said display screen further comprises a two dimensional primitive.

12. The method of claim 9 wherein said determining all tiles said extent intersects comprises determining screen coverage spanned by a bounding box defined by said control points.

13. An apparatus comprising:
    a memory to store data, said data comprising a parametric surface to be displayed;
    a processor coupled to said memory, said processor to process said parametric surface, said processing comprising:
      transforming control points corresponding to said parametric surface on a per surface basis;
      determining extent of said control points for said parametric surface on a per surface basis with a bounding box defined by a cubic Bezier curve; and
    a graphics controller coupled to said memory, said graphics controller to perform binning of said parametric surface on a per surface basis, said binning comprising:
      determining a plurality of tiles said extent intersects; and
      storing said parametric surface into memory storage bins corresponding to said tiles, wherein said storing comprises writing data for a plurality of control points corresponding to said parametric surface to a first tile storage area on a bin-by-bin basis.

14. The apparatus of claim 13 wherein said determining all tiles said extent intersects comprises determining screen coverage spanned by a bounding box defined by said control points.

15. The apparatus of claim 14 wherein said bounding box is a rectangular bounding box.

16. The apparatus of claim 14 wherein said bounding box is defined with a cubic Bezier curve.

17. The apparatus of claim 13 wherein said transforming said control points comprises circumscribing said parametric surface with a bounding box.

18. The apparatus of claim 13 further comprising a display unit to display said parametric surface.

19. A machine readable medium having embodied thereon a computer program, said computer program being executable by a machine to perform a method comprising:
    transforming control points for a parametric surface on a per surface basis, wherein said parametric surface is circumscribed with a bounding box defined by a cubic Bezier curve;
    determining extent of said control points on a per surface basis;
    determining a plurality of tiles intersected by said extent; and
    storing said parametric surface into memory storage bins, wherein said storing comprises writing data for a plurality of control points corresponding to said parametric surface to a first tile storage area on a bin-by bin basis.

20. The machine readable medium of claim 19 wherein said transforming control points comprises generating a bounding box to circumscribe said parametric surface.

21. The machine readable medium of claim 20 wherein said bounding box is defined with a cubic Bezier curve.

22. The machine readable medium of claim 19 wherein determining a plurality of tiles intersected by said extent comprises determining screen coverage spanned by a bounding box.

23. The machine readable medium of claim 19 further comprising binning said parametric surface, said binning conducted on a per surface basis.

24. The machine readable medium of claim 19 further comprising rendering said parametric surface.

* * * * *